(12) United States Patent
Shknevsky et al.

(10) Patent No.: US 11,989,447 B1
(45) Date of Patent: May 21, 2024

(54) DATA STORAGE SYSTEM WITH NON-DISRUPTIVE UPGRADE USING CO-EXISTING RING-BASED AND POOL-BASED WRITE LOGS

(71) Applicant: Dell Products L.P., Round Rock, TX (US)

(72) Inventors: Alexander Shknevsky, Fair Lawn, NJ (US); Oran Baruch, Tel Aviv (IL); Vladimir Shveidel, Pardes-Hana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/992,152

(22) Filed: Nov. 22, 2022

(51) Int. Cl.
*G06F 3/06* (2006.01)
(52) U.S. Cl.
CPC .......... *G06F 3/0656* (2013.01); *G06F 3/0604* (2013.01); *G06F 3/0679* (2013.01)
(58) Field of Classification Search
CPC ..... G06F 3/0656; G06F 3/0604; G06F 3/0679
See application file for complete search history.

(56) References Cited

U.S. PATENT DOCUMENTS

| 8,214,581 B2 | 7/2012 | Jang et al. | |
| 2013/0325828 A1* | 12/2013 | Larson | G06F 11/2087 707/703 |

* cited by examiner

*Primary Examiner* — Gurtej Bansal
(74) *Attorney, Agent, or Firm* — BainwoodHuang

(57) ABSTRACT

A data storage system non-disruptively transitions from using a ring-based write log to using a pool-based write log for buffering data being written to persistent secondary storage. The system initially creates the pool-based write log based on contents of the ring-based write log, and begins to mirror updates of the ring-based write log to the pool-based write log to establish synchronism. Subsequently, and based on an update flag indicating that an update process for the system has not yet completed, the system continues to mirror updates of the ring-based write log to the pool-based write log to maintain synchronism therebetween. Subsequently, and based on the update flag indicating that the update process for the system has completed, the system commences exclusive use of the pool-based write log and making the ring-based write log available for eventual removal.

16 Claims, 4 Drawing Sheets

DATA STORAGE SYSTEM WITH NON-DISRUPTIVE UPGRADE USING CO-EXISTING RING-BASED AND POOL-BASED WRITE LOGS

BACKGROUND

The invention is related to the field of data storage systems.

SUMMARY

A method is disclosed of non-disruptively transitioning a data storage system from using a ring-based write log to using a pool-based write log for temporarily buffering data being written to persistent secondary storage of the data storage system. The method includes steps performed as background operations concurrently with ongoing foreground processing of data storage read and write operations. The steps include initially creating the pool-based write log based on contents of the ring-based write log, and beginning to mirror updates of the ring-based write log to the pool-based write log to establish synchronism therebetween. Subsequently, and based on an update flag indicating that an update process for the data storage system has not yet completed, the system continues to mirror updates of the ring-based write log to the pool-based write log to maintain synchronism therebetween. Subsequently, and based on the update flag indicating that the update process for the data storage system has completed, the system commences exclusive use of the pool-based write log and making the ring-based write log available for eventual removal.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

A data storage system may use a ring-based write log architecture to optimize write operation latency. One of the big challenges with this architecture is large stepwise resource freeing due to the "tail movement constraint", i.e., the fact that entries are only freed from the tail end of the log, leaving unused intermediate-position entries unavailable for reallocation. In order to gain smoother space reclaiming, the ring-based log (which is majority of log space) may be converted into a pool-based log structure, which has a more random-access nature that promotes more efficient recycling of log entries. When such a software update is done on a live system, the upgrade to the new software version becomes very challenging, since the changes are usually done in a persistent structure that should be converted during the upgrade. One manner of update would be to temporarily stop operation of the system, but this causes data unavailability and associated disruption.

Described herein is a suspend-less non-disruptive upgrade (NDU; also referred to herein as "update") performed by co-existing a current ring log structure with a new pool log structure. When a data storage node is in the middle of an upgrade, it continues to use the ring-based log, while also keep updating the pool-based log updated in-memory. Once the node completes the upgrade, it begins using the pool-based log, which means that every operation goes directly to the pool-based log and not through the ring-based log, which is later removed from the system.

The present description is based primarily on an example of upgrading from a ring-based log structure to a pool-based log structure. However, those skilled in the art will recognize that the disclosed technique is more generally applicable to upgrading from one type of log structure to another type, assuming the ability to utilize both logs during an interim period of the upgrade.

Embodiments

Figure 1:
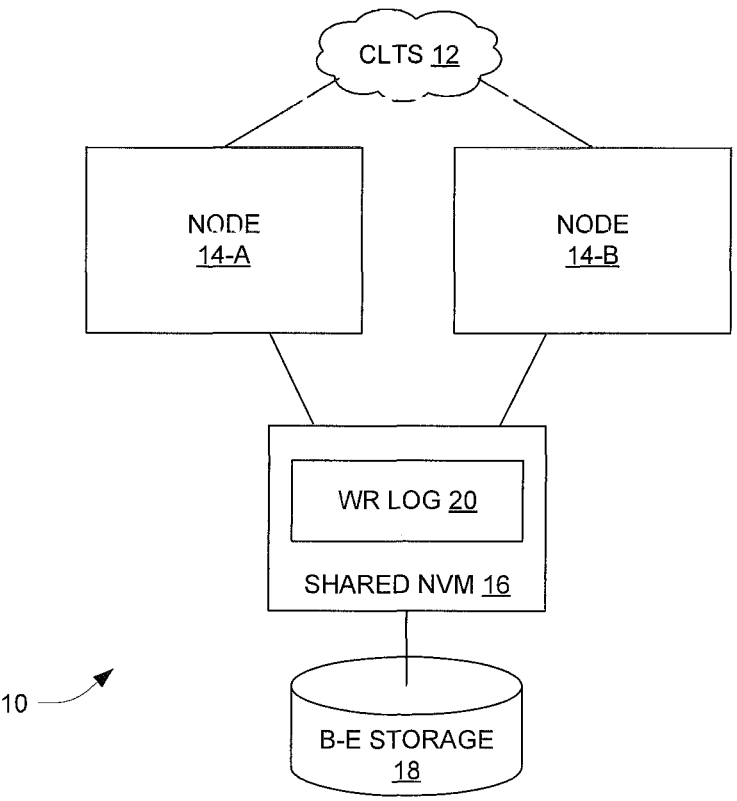
FIG. 1 is a block diagram of a data storage system organized as a two-node high-availability (HA) cluster.

FIG. 1 shows a data storage cluster 10 providing data storage services to a set of clients (CLTs) 12. The cluster 10 includes two storage processing nodes 14 (shown as 14-A and 14-B), a shared non-volatile memory (NVM) 16, and back-end (B-E) persistent storage 18 in the form of magnetic disks, Flash memory arrays, etc. In one embodiment the cluster 10 is a so-called "high availability" (HA), active-active cluster in which each node 14 handles a share of a client workload (data storage read and write operations) while also being available to assume the workload of the other node 14 in the event of malfunction or other disruption of service.

As shown, the system employs a write log (WR LOG) 20 (also known as "data journal") for temporary buffering of write data before it is flushed/de-staged to a more permanent location in the back-end storage 18. The write log 20 resides in the NVM 16 and is shared between the two nodes 14. As described further below, portions of the write log 20 are also cached within the volatile system memory of each node 14 during operation, to promote increased performance by virtue of much faster access time and higher bandwidth.

The use of the write log 20 reduces overall write latency, and in general the associated operations are as follows:

First, data received from a client 12 is persisted in the write log 20 which is realized using NVRAM or other fast media.

Once the data is successfully persisted, the cluster 10 has taken full responsibility for data consistency and sends an acknowledgement to the client 12, enabling the client to progress its operation.

Later there is a step of asynchronous data flushing, in which the data is flushed from the write log 20 to a final location in the back-end storage 18, and the log space is reclaimed/recycled for reuse.

The write log 20 maintains two persisted object types:

Page Buffers (PB)—where the user data is written. A typical PB size is 4 KB or 8 KB Page Descriptors (PD)—where metadata for writes and other data-modifying operations is stored (e.g., a logical block address of written/modified data, status flags, etc.). A PD for a write operation includes a reference to a corresponding PB; in one embodiment this reference is realized as a log sequence number that may be monotonically increasing. For some operations PDs are allocated and written without any reference to data (PB), in order to mark some event or dependence (e.g., create snapshot) and thereby track correct time ordering and dependencies of operations. So, usually the number of PDs in a system is much more than the number of PBs.

Figure 2:
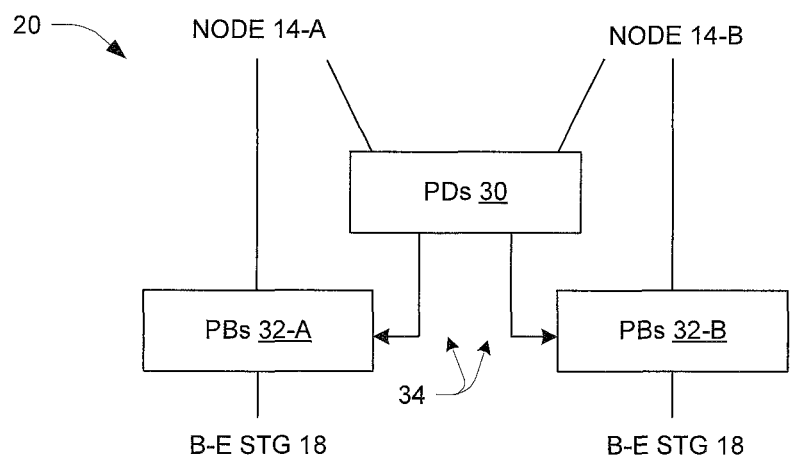
FIG. 2 is a schematic block diagram of a write log.

FIG. 2 shows an organization of a write log 20. A set of PDs 30 are shared between the two nodes 14, while the PBs 32 are separated into two groups, one group 32-A used by the node 14-A and the other group 32-B used by the node 14-B. The PB references stored by the PDs 30 (mentioned above) are indicated at 34.

Figure 3:
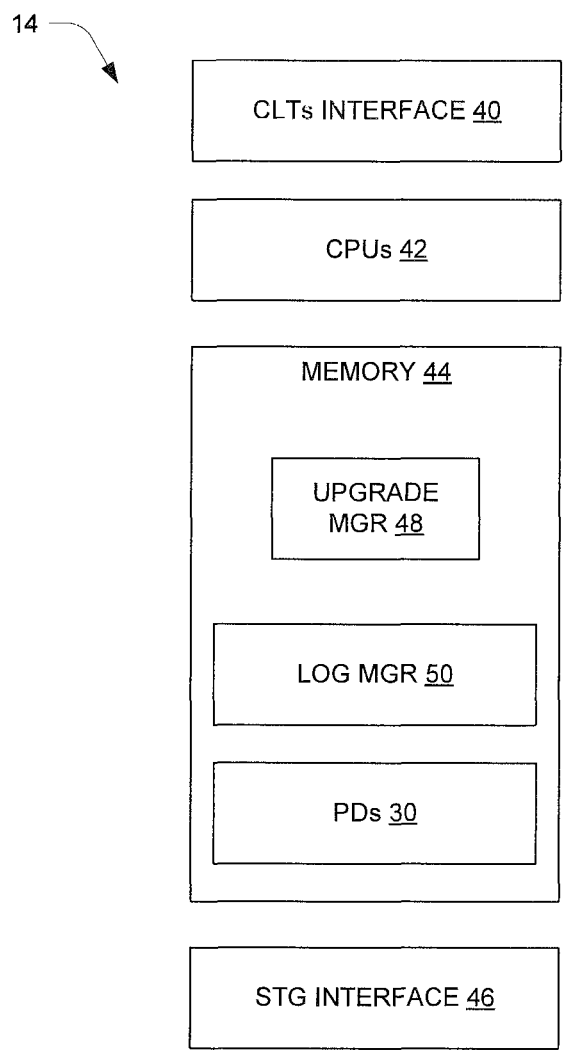
FIG. 3 is a schematic block diagram of a data storage node.

FIG. 3 shows pertinent structure and functional components of a node 14. It includes client interface circuitry 40, one or more processors (CPUs) 42, memory 44, and storage interface circuitry 46. As shown, the memory stores a cached copy of the PDs 30 and two functional components, namely an upgrade manager (MGR) 48 and a log manager 50. The log manager 50 performs all functions directly involving the write log 20, including new allocations, writes, and flushes. It also participates in the transition from using a ring-based log structure to a pool-based log structure as described herein. The upgrade manager 48 performs more general operations in connection with updating the system 10 from an existing configuration to a new configuration, which are also referred to as "compatibility levels" herein. An upgrade is an event in which various software components are replaced with new versions, and perhaps new components added as well, and system operation is resumed at the new compatibility level. In particular, an upgrade in the present context includes the transition to use of a pool-based write log 20, as described more below.

As noted above, one known way to maintain PDs 30 and PBs 34 in the write log 20 is "Ring Buffer", i.e., a ring of the corresponding objects. A ring has a Tail and a Head. New entries are always allocated from the Head, and reclaim of entries is always done from the Tail (i.e., an entry at the tail is flushed and freed, and then the tail is moved to the next entry). But one of the big challenges with ring-based log architecture is large stepwise resource freeing due to the tail movement constraint, as mentioned above. To gain smoother space reclaiming, it may be desirable to utilize a pool-based log structure instead, which has a more random-access nature that provides for smoother recycling of log entries. In an existing system already using a ring-based structure, it is necessary to effect an upgrade (or update) to a new pool-based structure, with such upgrade preferably being done as non-disruptively as possible.

A pool-based structure for page buffers can represent 4k or 8k page on the persistent media (NVM 16), used for a low latency write cache. The pool is preferably initialized with contiguous pages in an optimal block size, as the optimal block size which is in use by the storage system client could be bigger than storage page size in size for example 256 KB, 1 MB. When pages are allocated, the system tries to obtain a contiguous page buffer in the persistent media space 16 for better performance, writing into the media, and for minimizing the amount of IOs sent to the persistent media 16. When writing an IO to the storage, one or more PBs 32 are allocated from the Page Buffer Pool-based structure and the data is written from Page cache into the persistent media allocated space. A reference to each PB 32 is stored in an associated PD 30. With the pool-based structure, there is no dependency on a Tail, and each PB 32 may be released/reclaimed immediately after its contents have been flushed to back-end storage 18.

Figure 4:
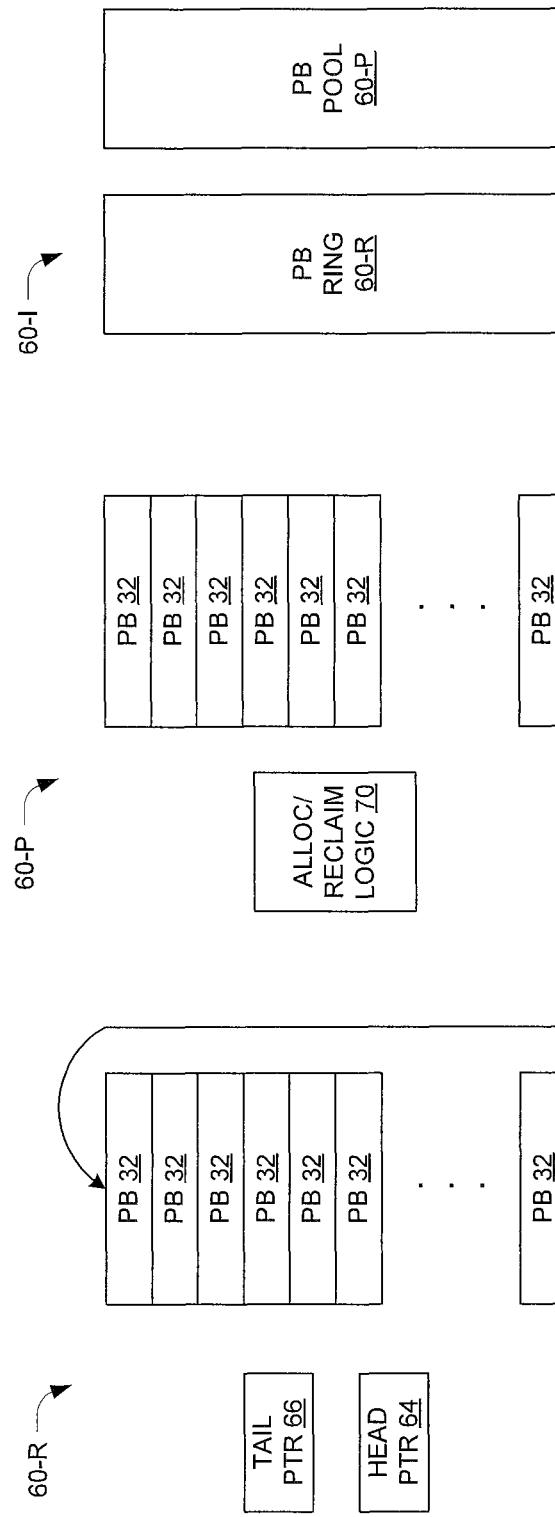
FIGS. 4A-4C are schematic diagrams of different versions of a page buffer structure of the write log at different stages of an upgrade.

FIGS. 4A-4C illustrate the different structures of the write log 20, particularly of the PBs 32.

FIG. 4A shows a ring structure 60-R, which is the organization of the PBs 32 prior to an upgrade. The PBs 32 are arranged as a sequential set occupying a range of memory/storage locations (i.e., an extent of logical block addresses (LBAs)), with an implicit transition 62 from the last PB location back to the first. A head pointer (PTR) 64 points to the current head of the ring (where new allocations are done), and a tail pointer 66 points to the tail (where entries are flushed and then reclaimed). At any given time, all entries from the tail forward to the head are allocated, while remaining entries are available for allocation. As noted above, the reference 34 to a PB 32 that is stored in a PD 30 is a monotonically increasing log sequence number, and the index of the corresponding PB 32 can be obtained using a modulo operation for example (modulo the size of the structure 60-R). Thus if the structure 60-R contains 100 PBs 32, for example, then an reference value of 150 points to location 50 of the structure 60-R (150 mod 100 equals 50).

FIG. 4B shows a pool structure 60-P, which is the organization of the PBs 32 after completion of an upgrade. There is a block of PBs 32 but no explicit or implicit ordering. Rather, they are individually and independently allocated and reclaimed by operation of allocation and reclaiming (ALLOC/RECLAIM) logic 70. The allocation and reclaiming logic 70 may implement a variety of techniques generally known in connection with pooled resources, such as aggregation, boundary alignment, defragmentation, garbage collection, etc.

FIG. 4C shows an intermediate structure 60-I, which is the organization during an upgrade. The system continues to use the ring-based structure 60-R as the primary write log mechanism, but also maintains a newly created PB pool 60-P whose contents mirror the contents of the PB ring 60-R. Each modification of the PB ring 60-R is also made to the PB pool 60-P, as described in more detail below. Once the upgrade is complete, the system begins exclusive use of the PB pool 60-P (FIG. 4B) and no longer uses or maintains the PB ring 60-R, which is eventually removed in order to utilize its storage resources.

Within each node 14, an upgrade is managed by the respective upgrade manager 48. The general flow for a non-disruptive upgrade (NDU) in an active-active storage system 10 is as follows:

(1) Replacing the software package in the nodes 14 to the new version
(2) In each node, working at the existing compatibility level (existing version) while the node is being upgraded to the new version in a non-disruptive way
(3) Once the upgrade is done, updating the compatibility level to the new version.

The above is done in each node 14 separately. Thus, each node 14 can work with a different compatibility level, and the system supports concurrent operation of nodes 14 at different compatibility levels. Within a node, the upgrade manager 48 controls the value of a variable or flag indicating the compatibility level, which it updates to the new compatibility level when an upgrade is completed. The new software package contains a log manager 50 that is primarily meant to work with the pool-based structure 60-P, but also has backward compatibility to be able to work with the ring-based structure 60-R during the interim period before the upgrade is completed. The new log manager 50 also has the ability to mirror updates from the ring structure 60-R to the pool structure 60-P during this interim period prior to completion of the upgrade.

An NDU with a software upgrade for the write log 20 is very challenging, because the changes are done in the persistent structure (in NVM 16) as well as the in-memory representation, which should be converted during the upgrade, and preferably with no complete stopping or suspending of the system. In modern storage systems, such an upgrade includes reconstruction of the metadata (MD) layer, changing the IO allocating path during and after the NDU, and also the recovery flows during and after the NDU.

As indicated by FIG. 4C, the present technique is a suspend-less non-disruptive upgrade that is based on having the pool-based structure 60-P and ring-based structure 60-R coexisting. The technique features the following:

(1) Maintain the same PDs MD layer—due to the active-active system architecture in which the nodes 14 may temporarily work at different compatibility levels, the MD layer (PDs 30) supports interleaving between the ring-based and the pool-based allocations. The interleaving is done without versioning, but rather by modifying the purpose of the PB reference. For ring-based allocations (on PB ring 60-R), the PB reference is interpreted as a PB ring monotonic increasing offset, while for the pool-based allocations (on PB pool 60-P) the reference is interpreted as the data tier offset.

(2) Writes—during the upgrade when writing an IO to the storage, PBs 32 are allocated from the ring-based structure 60-R and the same offsets are allocated in the pool-based structure 60-P. This is possible because of the one-to-one mapping between the two, i.e., each ring offset can be (log structure size) modulo applied to map to the pool offset. The system can rely on the compatibility level to decide in which path to write, ring-based or pool-based. Once the compatibility level is updated to the new version, the consistency of the pool-based structure 60-P is guaranteed so it can be used exclusively going forward, and the ring-based structure 60-P eventually removed so as to reclaim its resources.

(3) Flush/read and release buffers—For flushes and client reads (cache-miss), operation depends on the current compatibility level: (1) the PB reference is a ring monotonic increasing offset, which is thus converted to the pool log offset, or (2) the PB reference is a pool offset, so no conversion is required. In practice, it may be possible to apply the same conversion on both PB reference types, as it leads to the same persistent log offset. During the upgrade, the system continues to release buffers from the ring after the tail move, while releasing from the pool directly after flush and in response to a ring tail move also (if it wasn't released before).

(4) Recovery—when the system boots on the first time with the new software version, it recovers the ring-based structure 60-R and creates the pool-based structure 60-P based on the contents of the ring-based structure 60-R. When recovering the PB ring-based structure 60-R, the system iterates the ring between the tail and the head and constructs a bitmap of the used ring offsets, which is then used to create the PB pool-based structure 60-P.

a. If the system crashes during the upgrade, the same process is applied.

b. If the system crashes after upgrade (with the new compatibility version), the system utilizes the recovery of the PDs ring 60-R to build the same bitmap and recover the PB structure 60-P.

Figure 5:
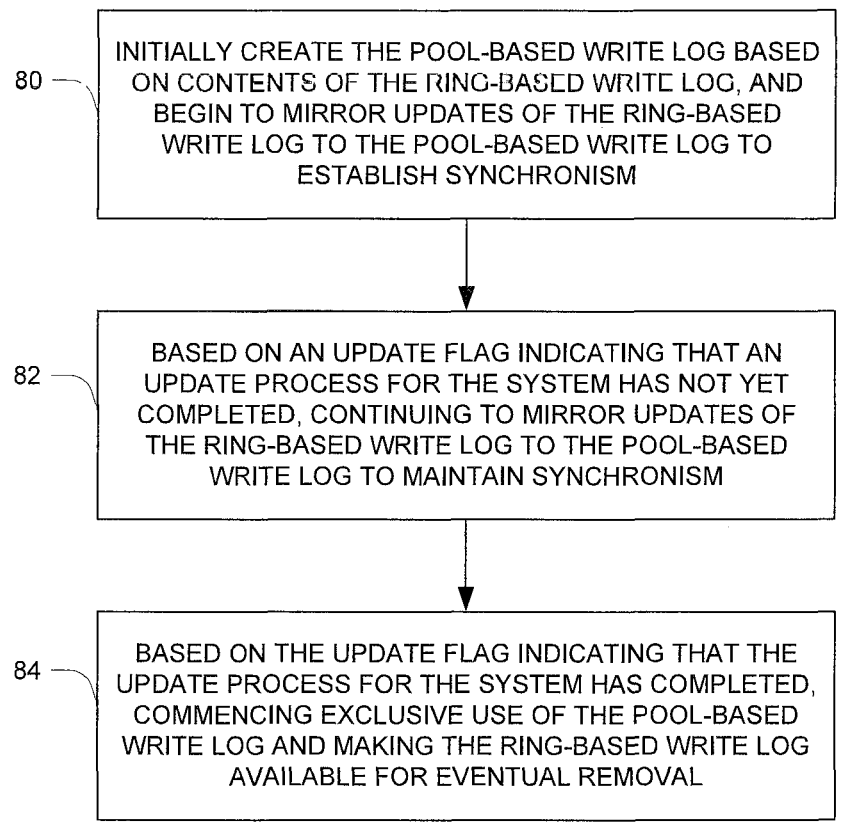
FIG. 5 is a flow diagram of operation in connection with an upgrade.

FIG. 5 illustrates key aspects of the above process. In FIG. 5 the steps are generalized to be applicable to other specific implementations. For example, in one embodiment the system is a 2-node cluster such as cluster 10, and the steps are performed by each node 14 based on a node-specific update flag (compatibility level). In other embodiments the technique may be used within a single-node data storage system (not part of an HA cluster), and/or the operation may be based on a global update flag (covering entire cluster) rather than a node-specific update flag.

Overall, the steps are directed to non-disruptively transitioning a data storage system (e.g., cluster 10) from using a ring-based write log (e.g., 60-R) to using a pool-based write log (e.g., 60-P) for temporarily buffering data being written to persistent secondary storage of the data storage system. For non-disruptive upgrade, the method steps are preferably performed as background operations concurrently with ongoing foreground processing of data storage read and write operations.

At 80, the pool-based write log is initially created based on contents of the ring-based write log, and the node/system begins to mirror updates of the ring-based write log to the pool-based write log to establish synchronism therebetween.

Subsequently at 82, and based on an update flag indicating that an update process for the data storage system has not yet completed (e.g., flag from upgrade manager 48, as explained above), the node/system continues to mirror updates of the ring-based write log to the pool-based write log to maintain synchronism therebetween.

Subsequently at 84, and based on the update flag indicating that the update process for the data storage system has completed, the node/system commences exclusive use of the pool-based write log, and makes the ring-based write log available for eventual removal.

As noted, the above description is directed primarily to upgrading from a ring-based log structure ring to a pool-based structure, but the technique can be applied more generally to NDU between any two log structures for which there is a straightforward and efficient conversion of page buffer references from one type (e.g., a ring structure offset) to another (e.g., a pool offset).

While various embodiments of the invention have been particularly shown and described, it will be understood by those skilled in the art that various changes in form and details may be made therein without departing from the scope of the invention as defined by the appended claims.

What is claimed is:

1. A method of non-disruptively transitioning a data storage system from using a ring-based write log to using a pool-based write log for temporarily buffering data being written to persistent secondary storage of the data storage system, the method comprising the steps, performed as background operations concurrently with ongoing foreground processing of data storage read and write operations, of:

initially creating the pool-based write log based on contents of the ring-based write log, and beginning to mirror updates of the ring-based write log to the pool-based write log to establish synchronism therebetween;

subsequently, and based on an update flag indicating that an update process for the data storage system has not yet completed, continuing to mirror updates of the ring-based write log to the pool-based write log to maintain synchronism therebetween; and subsequently, and based on the update flag indicating that the update process for the data storage system has completed, commencing exclusive use of the pool-based write log and making the ring-based write log available for eventual removal.

2. The method of claim 1, wherein the data storage system is a two-node cluster, and the steps are performed by each node independently.

3. The method of claim 2, wherein the nodes have respective sets of page buffers of the ring-based write log and of the pool-based write log, and the nodes have shared access to a single set of page descriptors used for both ring-based and pool-based allocations.

4. The method of claim 3, wherein each page descriptor includes a page buffer reference being interpreted as a monotonic increasing offset for page buffers of the ring-based write log, and as a data tier offset for the page buffers of the pool-based write log.

5. The method of claim 1, wherein, for a write operation occurring when the update process has not yet completed, page buffers are allocated from the ring-based write log and page buffers at the same offsets are allocated from the pool-based write log.

6. The method of claim 1, wherein, for flushes and client reads, a page buffer reference of the write log is converted from a ring monotonic increasing offset to a pool log offset.

7. The method of claim 1, wherein, when the data storage system boots a first time after commencement of the update process, the data storage system recovers the ring-based write log and creates the pool-based write log based on the contents of the ring-based write log.

8. The method of claim 7, wherein, when the data storage system boots after a crash occurring during the update process, the data storage system recovers the ring-based write log and creates the pool-based write log based on the contents of the ring-based write log.

9. A data storage system having persistent secondary storage and processing circuitry executing computer program instructions to transition from using a ring-based write log to using a pool-based write log for temporarily buffering data being written to the persistent secondary storage, the transition comprising the steps, performed as background operations concurrently with ongoing foreground processing of data storage read and write operations, of:

initially creating the pool-based write log based on contents of the ring-based write log, and beginning to mirror updates of the ring-based write log to the pool-based write log to establish synchronism therebetween;

subsequently, and based on an update flag indicating that an update process for the data storage system has not yet completed, continuing to mirror updates of the ring-based write log to the pool-based write log to maintain synchronism therebetween; and subsequently, and based on the update flag indicating that the update process for the data storage system has completed, commencing exclusive use of the pool-based write log and making the ring-based write log available for eventual removal.

10. The data storage system of claim 9, wherein the data storage system is a two-node cluster, and the steps are performed by each node independently.

11. The data storage system of claim 10, wherein the nodes have respective sets of page buffers of the ring-based write log and of the pool-based write log, and the nodes have shared access to a single set of page descriptors used for both ring-based and pool-based allocations.

12. The data storage system of claim 11, wherein each page descriptor includes a page buffer reference being interpreted as a monotonic increasing offset for page buffers of the ring-based write log, and as a data tier offset for the page buffers of the pool-based write log.

13. The data storage system of claim 9, wherein, for a write operation occurring when the update process has not yet completed, page buffers are allocated from the ring-based write log and page buffers at the same offsets are allocated from the pool-based write log.

14. The data storage system of claim 9, wherein, for flushes and client reads, a page buffer reference of the write log is converted from a ring monotonic increasing offset to a pool log offset.

15. The data storage system of claim 9, wherein, when the data storage system boots a first time after commencement of the update process, the data storage system recovers the ring-based write log and creates the pool-based write log based on the contents of the ring-based write log.

16. The data storage system of claim 15, wherein, when the data storage system boots after a crash occurring during the update process, the data storage system recovers the ring-based write log and creates the pool-based write log based on the contents of the ring-based write log.

* * * * *